Patented June 4, 1935

2,003,965

UNITED STATES PATENT OFFICE 2,003,965

METHOD FOR PRODUCTION OF PURE WHITE SUGAR

Ignaz Bloch, Dessau, Germany

No Drawing. Application May 14, 1931, Serial No. 537,493. In Germany January 22, 1931

9 Claims. (Cl. 127—64)

The invention relates to a process of producing pure sugar from fill-mass and from raw sugar.

It is an object of the invention to provide a process in which the period of converting the mass cuite into sugar or the raw sugar into refined sugar is considerably reduced, as compared with the known processes.

Another object of the invention is to provide a process wherein the waste induced in the known process by an excessive dissolution of crystals of sugar is eliminated.

It is, furthermore, an object of the invention to provide a process of producing pure sugar from the mass cuite or from raw sugar that can be carried out more economically than it has been practiced heretofore.

Another object of the invention is also to provide a process of this character in which the syrups adhering to sugar crystals are readily detached so as to improve the ultimate product, and wherein this step of detaching the syrups is carried out in relatively short time.

It is also an object of the invention to provide a process in which for the purpose of separating the sugar crystals from the syrup, glycol is used.

With these and other objects in view, the process is described in the following specification which also includes a short reference to processes of producing sugar, as carried out heretofore.

In known processes for producing sugar of pure quality, the fill-mass or mass cuite is converted into sugar of pure quality in various ways. The mass cuite, upon leaving the boilers, is treated in centrifugal machines, and this spinning operation divides the mass cuite into sugar and syrup. This raw sugar may again be subjected to a second treatment in centrifugal machines, since it contains still a considerable quantity of syrup, and for facilitating this second spinning operation, additional syrup may be added thereto. The syrup which has been separated from the raw sugar by the first spinning operation may be separately subjected to an aging treatment, after which it may again be subjected to a centrifugal treatment. The raw sugar produced by the first and second spinning operation may be washed with sugar containing solutions, water or steam, as desired. The sugar produced by this treatment is usually designated as white sugar.

Where, however, granulated sugar is to be produced, the sugar remaining after the first spinning operation of the mass cuite is directly washed with sugar containing solutions or with water or steam.

These known methods have the disadvantage that considerable quantities of sugar remain in a state of solution, and these solutions must be reboiled in order to recover the sugar therefrom. These quantities of sugar are enlarged by the washing treatment with water or steam, since these liquids dissolve a fairly large portion of the sugar crystals already formed. In order to render this process economical on a commercial scale, it is, therefore, also necessary to reboil the washing liquids.

In order to separate the syrup which adheres to the crystals of the sugar without requiring a washing operation by means of a liquid in which the crystals may be dissolved, it has been proposed heretofore to treat the sugar with liquids which have a less dissolving effect on the crystals than water or steam. It has been proposed for instance to treat the sugar with acetic acid. (See Zeitschrift für Zuckerindustrie, Czechoslovakian Rep. 49, 100; Chemical Abstracts, 19, 743 (1925), German Patent 435,515; Chemisches Zentralblatt, 1926 II, 3010.) In treating the sugar crystals with acetic acids, however, there is danger that the sugar will be inverted.

Attempts have also been made to treat the sugar with aqueous alcohol such as ethyl alcohol and methyl alcohol, (as for instance in the United States Patent 746,177). In this prior method it had been suggested to treat the mass cuite before it enters the spinning apparatus and immediately upon leaving the boiling apparatus, with concentrated alcohol.

According to the present invention, however, a separation of the sugar crystals from residuary material can more readily be effected than heretofore by treating the mass with glycol (ethylene glycol $C_2H_6O_2$).

This compound acts very rapidly on the mass cuite for separating it into raw sugar and syrup. It also acts very rapidly on raw sugar for detaching from the same the syrup which still adheres after the spinning operation to the crystals. At normal temperature, or at not excessive elevated temperature, this compound has no dissolving effect on the sugar crystals, and in this respect, therefore, it differs materially from the water or steam or from the chemical compounds mentioned above which have been used heretofore for similar purposes. It also prevents the inversion of the sugar with which it comes into contact.

The treatment of the mass containing sugar and residuary material, as syrup with the glycol is effected by adding the glycol to the mass and agitating the mixture. If the mixture is agitated, the separation of the residuary materials from the sugar crystals will take place in shorter time than when the mixture is left standing.

This method of detaching syrups from the mass, whether it is mass cuite or raw sugar, can also be applied to purifying other masses.

When the mass cuite is treated with glycol, a sugar is produced which has the qualities of the granulated product, when the raw sugar forming the end product of the spinning operation of the mass cuite is treated with glycol, a sugar is obtained which has the qualities of wash sugar or white sugar, resembling in every respect that sugar product which heretofore has been obtained by washing the end products of the spinning operation with water or steam.

It also has been discovered that sugar can be separated from sugar containing syrups by the addition of glycol to these syrups. Syrups of this character are produced in the manufacture of sugar, as for instance, the so-called green syrup which is a by-product of the manufacture of sugar. When green syrup is left standing after glycol has been added thereto, sugar crystals are formed therein which can be separated from the residuary material. The same separation of sugar crystals from the syrup also may be produced by adding glycol to the green syrup and shaking the mixture. When the last named method is used, the period required for effecting the separation of the sugar crystals from the residuary material of the green syrup requires less time.

The glycol liquors used in this treatment may be left standing, and the sugar contained in them is then precipitated therefrom without requiring a boiling and reboiling of the glycol liquor; while heretofore those liquids which had been used for separating the syrup from the sugar crystals had to be reboiled in order to recover the sugar therefrom.

In the following examples the influence of the glycol treatment on various products is demonstrated:

*Examples*

1. Mass cuite of a weight of 8.3 kilograms or 6.7 kilograms or 6.2 kilograms with 5 kilograms of sugar crystals is mixed with 3 liters of glycol and the mixture is either left standing or is agitated by shaking or the like. The duration of the treatment is fifteen minutes. The temperature may be ordinary temperature or slightly raised temperature. Upon separation of the solid parts of the mixture from the liquids, the crystalline sugar remains without any syrup adhering thereto.

2. Raw sugar produced by the spinning treatment of mass cuite is subjected to the same treatment; 10 kilograms of raw sugar is mixed with 5 liters of glycol and left standing for a period of fifteen minutes or agitated during the same period. The temperature may be ordinary temperature or slightly elevated. The solid and the liquid are then separated, leaving a sugar free from attached syrup.

3. To a mass cuite of the weight of 8.3 kilograms or 6.7 kilograms or 6.2 kilograms and containing 5 kilograms of sugar crystals are added 4 liters of a glycolic liquor which has been obtained by treating with glycol and a fill-mass or sugar in accordance with Examples 1 or 2 respectively given above. The mixture is left standing for 20 minutes or is agitated, and the solids and liquids are then separated. The product obtained is a granulated sugar which is sufficiently free of syrups to permit complete detachment of the syrups by subsequent washing with a sugar-containing solution or with water or steam.

4. Ten kilograms of raw sugar furnished as the end product of a spinning operation of mass cuite are mixed with 6 liters of a glycolic liquor obtained as the result of a treatment illustrated by Examples 1 or 2 given above. The mixture is left standing or is agitated for about twenty minutes at normal or slightly raised temperature, and the solids and liquids are then separated. The affinade sugar produced by this treatment also may be converted into refined sugar free of syrups by washing with a sugar liquor or with water or steam.

5. Mass cuite of a weight of 8.3 kilograms or 6.7 kilograms or 6.2 kilograms is enriched by the addition of 1 kilogram of sugar syrup. To this mixture are added 2 liters of glycol, and the mixture is then treated, as in Example 1 or 2. The crystals remaining after the separation of the liquids from the solids again may be washed if necessary to free them from the traces of adhering syrup.

6. Ten kilograms of raw sugar are treated with a mixture of 1 kilogram of sugar syrup and 2 liters of glycol, the mixture either being left standing or being agitated as described with reference to Example 2. After separation of liquids and solids, the crystals are treated by washing, if necessary, as described in Examples 3 and 4.

7. Two kilograms of green syrup are mixed with 1 liter of glycol, and the mixture is either left standing or is agitated. This treatment leads to the precipitation of sugar crystals from the residuary molasses, and upon separation of the sugar from the residuum, the sugar may be treated again by washing as described in Example 3 or 4.

From these examples it will be seen that the process of producing sugar from masses containing crystallized sugar and residuary material can be carried out by making use of glycol or by making use of mixtures consisting of glycol and syrup, which mixtures have been produced by preceding treatments of mass cuite or the like with glycol. It is also feasible to apply this operation in a sequence of steps, as for instance by washing the mass cuite successively with different glycol mixtures, each succeeding glycol mixture containing less syrup than the preceding glycol syrup mixture.

I claim:

1. In a process of producing sugar from a mass containing sugar crystals and syrup, the step of adding glycol to the mass, agitating the mass and separating the sugar formed by the admixture of glycol from the syrup containing the glycol.

2. A process of producing sugar from a mass containing sugar and residuary material, which consists in adding glycol to the mass at raised temperature, and separating the sugar formed by the addition of the glycol from the glycol containing residuary product.

3. A method of producing sugar from mass cuite which consists in treating the mass cuite with glycol and separating the sugar crystals from the residuary mass containing the glycol syrup.

4. A process of producing sugar from raw sugar, which is the end product of a spinning operation of mass cuite, which consists of adding to the raw sugar a liquor comprising a mixture of syrup and glycol, and separating the sugar crystals detached from the syrup of the raw sugar from the residuary mass.

5. A process of producing sugar which consists in treating mass cuite with a glycol syrup liquor produced by the processing of another mass cuite with glycol, and washing the crystals detached from the syrup of the mass cuite with glycol liquors in such manner that the succeeding liquors always contain less syrup than the preceding ones.

6. In the manufacture of sugar, wherein an intimate mixture of sugar crystals and residuary material is produced, the step of separating the crystals from the residuary mass by adding glycol to the mixture.

7. The process of manufacturing sugar, consisting in producing an intimate mixture of sugar crystals and residuary material and separating the crystals from the residuary material by adding glycol to such mixture while the latter is at substantially normal temperature and then separating the solid part from the liquid part.

8. The process of manufacturing sugar, consisting in producing an intimate mixture of sugar crystals and residuary material and separating the crystals from the residuary material by adding glycol to the mixture substantially in the proportions of 3 liters of glycol to 8 kilograms of the mixture, and permitting the whole to stand for substantially 18 minutes and then separating the resultant solid part from the resultant liquid part.

9. The process of manufacturing sugar, consisting in producing an intimate mixture of sugar crystals and residuary material and separating the crystals from the residuary material by adding glycol to the mixture while the latter is at substantially normal temperature substantially in the proportions of 3 liters or glycol to 8 kilograms of the mixture, and permitting the whole to stand for substantially 18 minutes and then separating the resultant solid part from the resultant liquid part.

IGNAZ BLOCH.